June 23, 1959     R. H. BOWER     2,891,508
MARAUDER GUARD
Filed Jan. 29, 1958
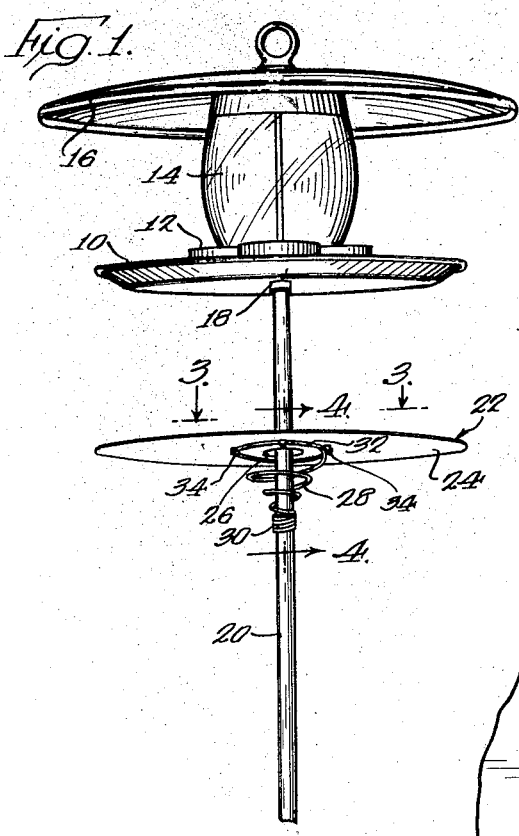
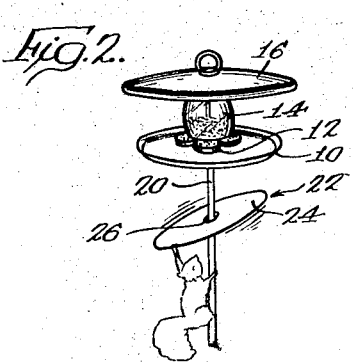
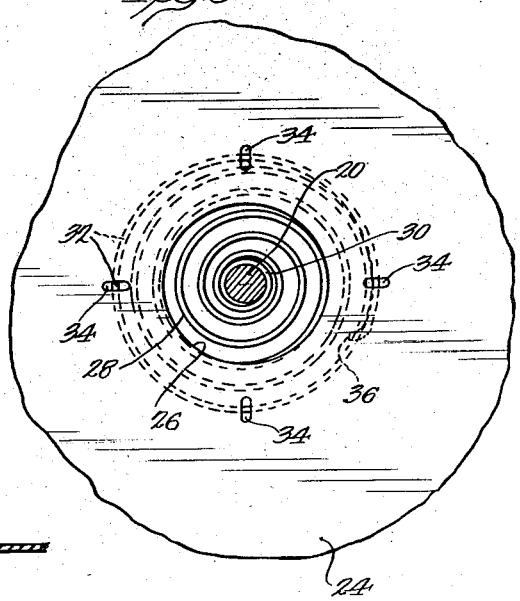
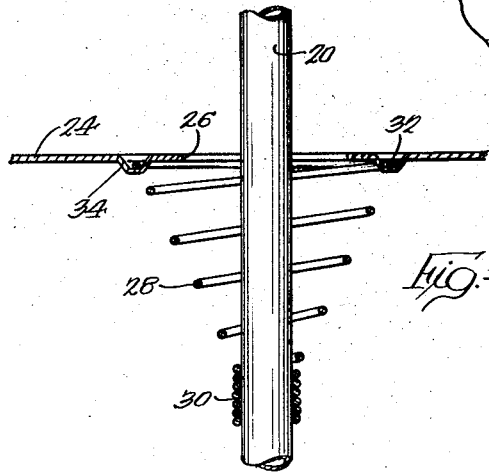
INVENTOR.
Ralph H. Bower
BY
Brown, Jackson, Boettcher & Dienner
Attys.

United States Patent Office 2,891,508
Patented June 23, 1959

2,891,508

MARAUDER GUARD

Ralph H. Bower, Goshen, Ind., assignor to The Bower Manufacturing Co., Inc., Goshen, Ind., a corporation of Indiana Application January 29, 1958, Serial No. 711,836

2 Claims. (Cl. 119—51)

The present invention relates to marauder guards, and particularly, to an improved guard device for preventing squirrels, cats and other pestiferous mammals from climbing the posts of post-supported bird feeders, thereby to protect the birds and their food from the climbing marauders.

A popular type of bird feeder is that which is adapted to be placed on top of a post, preferably a readily movable post to accommodate convenient location of the feeder at the option of the user. The post generally is a small diameter metal pipe of a length to support the feeder four or more feet off the ground. Adoption of a metal pipe of small diameter and such length was deemed adequate to prevent cats and the like from interfering with the peaceful feeding of the birds and to prevent theft of their food. However, it has been found that climbing marauders, especially squirrels, can climb these posts, and that they can successfully surmount from the post even a large diameter feeding tray.

The object of the present invention is to provide a guard for preventing squirrels and other marauders from climbing to areas where their presence is not desired, and especially, to prevent them from climbing the small diameter feeder-supporting metal posts to which I have made reference.

Another object of the invention is to provide an improved marauder guard for post-supported bird feeders and the like comprising a rigid plate having a large hole therethrough accommodating free passage of the post, and means flexibly mounting the plate on the post, the plate due to its mounting being deflected or tilted by a climbing marauder to an inclined position which affords the marauder no opportunity for gaining sufficient foothold to surmount the plate, the mounting means for the plate effectively blocking off the hole therein to prevent the marauder from gaining access to the feeder through the hole.

A further object of the invention is the provision of an improved guard for preventing marauders from climbing posts and the like comprising a rigid annular plate through which the post freely extends, the plate having substantial clearance at its inner margin relative to the post, and a conical spring having a small diameter tightly coiled portion at one end frictionally engaging the post and a large diameter winding at its other end secured to the plate, the spring flexibly supporting the plate on the post and accommodating adjustment of the plate longitudinally of the post, the spring accommodating tilting of the plate to a sharply inclined position to prevent squirrels and the like from surmounting the plate.

A still further object of the invention is the provision of an improved marauder guard that is 100% effective in accomplishing its intended function, yet is attractive, easy to install and adjust, of long service life and highly economical.

Other objects and advantages of the invention will become apparent in the following detailed description of a preferred embodiment of the invention.

Now, in order to acquaint those skilled in the art with the manner of making and using my improved marauder guard, I shall describe, in connection with the accompanying drawing, a preferred embodiment of the guard.

In the drawing:

Figure 1 is a perspective view, from below, of a post-supported bird feeder equipped with the marauder guard of the invention;

Figure 2 is a perspective view, on a reduced scale and from above, illustrating the effectiveness of my improved guard in preventing a squirrel from gaining access to the feeder;

Figure 3 is a fragmentary plan view of my improved guard, the view being taken substantially on line 3—3 of Figure 1 and on an enlarged scale; and Figure 4 is a vertical cross section of my improved guard, the view being taken substantially on line 4—4 of Figure 1.

Referring now to the drawing, I have shown in Figures 1 and 2 a bird feeder of the type to which the present invention has particular application. The feeder comprises a lower tray 10 on which the birds may stand, a feeding dish 12 to the upper side of the tray 10, a feed container 14 for storing feed and automatically filling the dish 12, and an upper disk or roof 16 for protecting the birds and their food from the elements. At its lower side, the feeder is provided with a collar 18 by means of which the feeder may be mounted on top of a small diameter metal post 20, the post being readily insertable into the ground to facilitate convenient location of the feeder.

In use of the illustrated feeder, it was found that even with a one-half inch diameter tubular post that supported the feeder at least four feet above ground, and with a lower tray 10 twelve inches in diameter, squirrels could negotiate the post and surmount the tray 10, thereby driving away the birds and depriving them of their food.

The object of the present invention, as previously stated, is to prevent such marauding by provision of the device that is illustrated in its preferred form in the drawing and indicated generally at 22. As shown, the marauder guard of the invention comprises an annular plate 24 of relatively large diameter having a center hole 26 considerably larger than the post for accommodating free passage therethrough of the post. An annular form of plate has been adopted since it is most compatible to the illustrated design of bird feeder and is aesthetically desirable in terms of its concentricity with the post and the feeder. Also, it serves to define an outer edge spaced a given distance from the post at all points. However, other forms of plate may be adopted as desired, provided that the same have a central aperture 26 substantially larger than the post.

In the present instance, wherein the feeder is supported on a one-half inch diameter post, I have provided a center hole 26 in the plate that is four inches in diameter. As a rule-of-thumb, the hole should be sufficiently large to accommodating tilting or deflection of the plate to a position inclined at least 60 degrees and preferably more to the horizontal. However, the arc of permissible tilting relative to the outer diameter of the plate should not be such as to accommodate disposition of the outer edge of the plate any closer to the post than about two to three inches.

The outer diameter of the plate 24 is not especially critical, except that the plate must be large enough to prevent a squirrel or cat from straddling the plate and gaining foothold on the post to opposite sides of it, and that the plate satisfy the limitation set forth in the above paragraph. In the preferred embodiment illustrated, the plate has a diameter of about 12 inches to insure an adequate obstruction to climbing marauders, and also to conform aesthetically with the design of the bird feeder.

The plate 24 is flexibly supported on the post 20 for tilting movement or deflection relative thereto in the arc defined by means comprising, preferably, a conical spring 28. The spring 28 at one end thereof includes a portion 30 comprised of a plurality of abutting windings of small diameter, and at its other end includes at least one large diameter winding 32, the latter winding having a diameter greater than the diameter of the hole 26. The spring is secured at its large diameter end to the plate in concentric relation therewith, the spring being wound to provide a plane surface at the large diameter end thereof which surface is perpendicular to the axis of the small diameter windings 30. At circumferentially spaced points about the center hole of the plate, preferably at four places, V-shaped tabs 34 are punched outwardly from the plane of the plate to define means for receiving the winding 32 of the spring. The end of the spring is simply slipped through these tabs to secure the plate to the winding 32, whereby the plate and spring are concentrically joined. The free end of the spring is preferably turned radially inward, as indicated at 36 in Figure 3, to prevent inadvertent disassociation of the spring and plate.

The small diameter end portion 30 of the spring has an inner diameter slightly less than the outer diameter of the post 20 and is adapted to be slipped over the post frictionally to engage the same. The post passes axially through the spring and through the hole 26 in the plate, and the portion 30 of the spring frictionally retains the guard on the post. Due to its frictional engagement with the post, the spring can readily be adjusted longitudinally of the post to any desired position, preferably a position in which the plate is roughly a foot below the tray 10 of the feeder. The spring may be located either above or below the plate 24 on the post, but best results appear to be obtained when the spring is below the plate.

In its assembled condition, the spring adjustably mounts and flexibly supports the plate 24 on the post 20, normally retains the plate substantially parallel to the tray 10, accommodates tilting movement of the plate relative to the post and blocks off the center hole in the plate to prevent marauders from circumventing the plate through the hole. In use, as illustrated in Figure 2, a squirrel or other climbing marauder is compelled to grasp the outer edge of the plate 24 in an attempt to continue its ascent of the post. As the marauder grasps the edge of the plate, the plate tilts or deflects and presents an inclined surface affording the marauder no point at which to gain a foothold to the upper side of the plate. Should the marauder attempt to swing out around the plate, the plate will tilt to a steep angle causing the animal to fall to the ground for lack of foothold.

For purposes of further assuring the described result, and to afford a device of utmost economy, the plate 24 preferably comprises a thin disk stamped from sheet metal. The metal employed is preferably aluminum, which is highly resistant to the elements and will not lose its attractive appearance though placed outdoors the year around. In keeping with this objective, the spring 28 is preferably formed of spring steel and is cadmium plated for rust resistance.

The device of the invention, although described herein with specific reference to post supported bird feeders, is believed to have general application as a guard against climbing marauders and other pestiferous mammals. For example, the device of the invention could be employed to prevent wharf rats from climbing the lines of ships when installed on a substantially vertical portion of the line.

From the foregoing, it is apparent that the present invention provides a device of exceedingly long life and economical construction that positively prevents squirrels, rodents, cats, and like marauders from climbing to areas where their presence is not desired. The objects of the invention have thus been shown to be attained in an economical, convenient, and practical manner.

While I have shown and described what I regard to be the preferred embodiment of my invention, it is to be appreciated that various changes, rearrangements, and modifications may be made therein without departing from the scope of the invention, as defined by the appended claims.

I claim:

1. A marauder guard for preventing marauders from climbing the posts of post-supported bird feeders and the like comprising a large diameter annular plate having a center hole of a diameter several times greater than the diameter of the post, said hole accommodating free passage therethrough of the post and providing sufficient clearance between said plate and the post to accommodate tilting of said plate to a sharply inclined position wherein it forms an angle of about 30 degrees or less relative to the post, said plate being of sufficient diameter relative to the diameter of said hole to be spaced at its outer edge no less than about two inches from the post when the plate is in its position of maximum inclination, and a conical spring having a small diameter tightly coiled portion at one end thereof for frictionally engaging about the post and a large diameter winding at the other end thereof of a size larger than said hole, said large diameter winding being secured to said plate about said center hole, said spring flexibly supporting said plate on the post substantially normal thereto, accommodating adjustment of said plate longitudinally of the post, blocking off the center hole in said plate and accommodating tilting of the plate to its said sharply inclined position relative to the post to mitigate against a marauder gaining foothold on the plate and surmounting the plate.

2. A marauder guard for posts and the like comprising a large diameter metal annulus having a center hole several times larger than the post for free passage therethrough of the post, and a conical spring concentric with said annulus and having a large diameter end secured to said plate adjacent its inner margin and a small diameter end of a diameter not greater than that of the post to be frictionally engaged about the post.

References Cited in the file of this patent

UNITED STATES PATENTS

| | | |
|---|---|---|
| D. 174,139 | Sadler | Mar. 1, 1955 |
| 1,917,371 | Hill | July 11, 1933 |
| 2,584,782 | Beckman | Feb. 5, 1952 |

FOREIGN PATENTS

| | | |
|---|---|---|
| 11,426 | Great Britain | Oct. 26, 1895 |